Oct. 28, 1952 J. R. SNYDER 2,615,535
DIRECT ACTING FRICTION SHOCK ABSORBER
Filed Aug. 12, 1948 2 SHEETS—SHEET 1

INVENTOR.
JACOB RUSH SNYDER
BY Hudson, Boughton,
Williams, David & Hoffmann.
ATTORNEYS Oct. 28, 1952     J. R. SNYDER     2,615,535
DIRECT ACTING FRICTION SHOCK ABSORBER Filed Aug. 12, 1948     2 SHEETS—SHEET 2

INVENTOR.
JACOB RUSH SNYDER
BY Hudson, Boughton,
Williams, David & Hoffmann.
ATTORNEYS Patented Oct. 28, 1952

2,615,535

UNITED STATES PATENT OFFICE 2,615,535

DIRECT ACTING FRICTION SHOCK ABSORBER

Jacob Rush Snyder, Cleveland, Ohio, assignor to Thompson Products, Inc., Cleveland, Ohio, a corporation of Ohio Application August 12, 1948, Serial No. 43,898

1 Claim. (Cl. 188—129)

This invention relates to shock absorbing devices of the kind having a plunger operable in a housing in which a fluid material is confined and which devices are suitable for use on motor vehicles and for various other purposes. The invention relates more particularly to shock absorbers in which the plunger is an expansible friction unit and in which the confined fluid material is a loose dry lubricating powder.

An object of the present invention is to provide an improved shock absorber of the type having a friction unit operable therein and in which the friction element or lining of the unit is molded from a powdered metal, preferably a copper-base powdered metal, and produces a smooth shock absorbing action and has a frictional characteristic which remains substantially constant regardless of temperature variations or other changes in the operating conditions of the device.

Still another object of this invention is to provide a direct action shock absorber of the type having an expansible friction unit operable in a tubular housing containing a confined loose dry lubricating powder and in which a coil spring of substantially hourglass shape is located in the housing, preferably one such spring on each side of the friction unit, and in addition to preventing packing of the powder in the housing such spring or springs are adapted to be engaged by the unit upon the occurrence of sudden heavy shocks for causing further expansion of the unit.

As a further object, this invention aims to provide an improved shock absorber of the character mentioned in which the expansible friction unit comprises segments of a shape such that staggered joints are formed between the pairs of segments and prevent grooving of the housing wall during operation of the device.

Yet another object is to provide an improved friction shock absorber of the character mentioned in which the confined loose dry lubricating powder is a powder whose characteristics are substantially unaffected in response to temperature changes or other variations occurring in the operating conditions under which the shock absorber functions.

The invention can be further briefly summarized as consisting in certain novel combinations and arrangements of parts hereinafter described and particularly set out in the claim hereof.

In the accompanying sheets of drawings.

Figure 1:
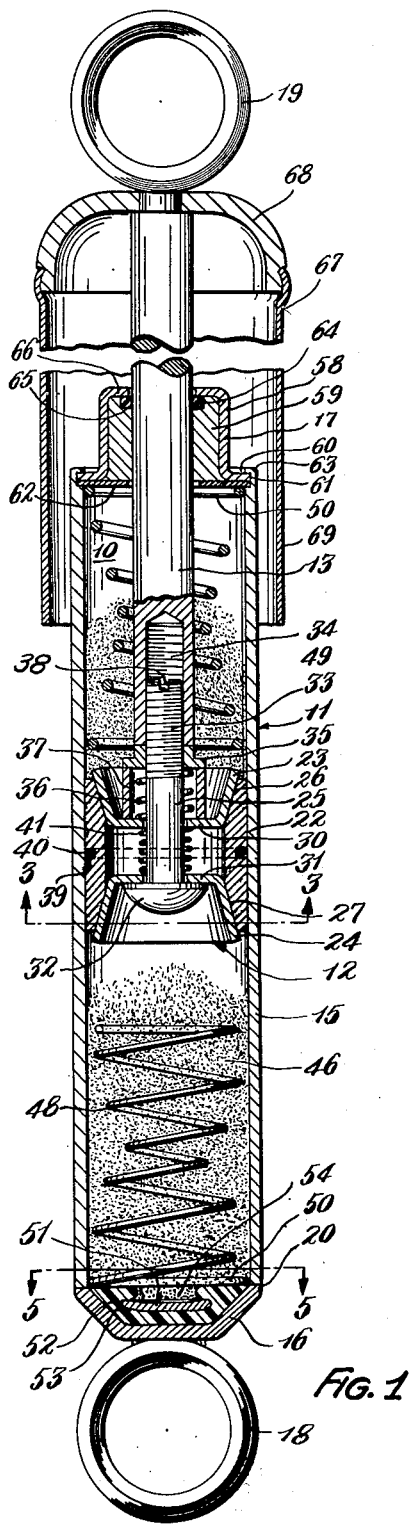
Fig. 1 is a longitudinal section taken through a shock absorber embodying the present invention.
Figure 2:
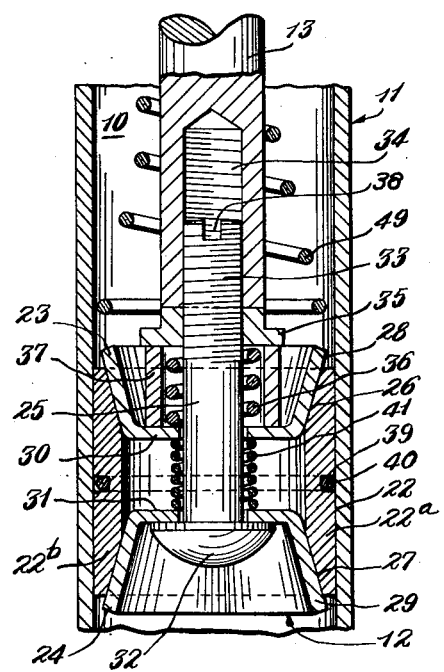
Fig. 2 is a partial longitudinal section corresponding with a portion of the shock absorber of Fig. 1 and showing the friction unit on a larger scale.
Figure 3:
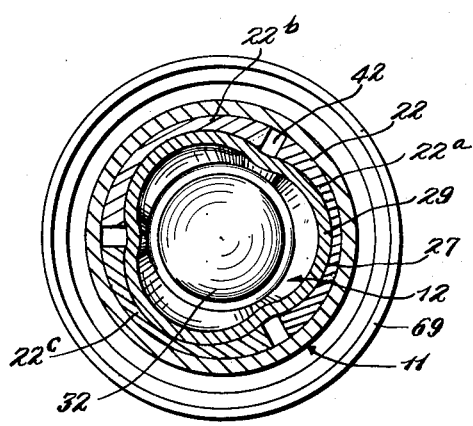
Fig. 3 is a transverse section taken through the shock absorber and the friction unit thereof, as indicated by section line 3—3 of Fig. 1.
Figure 7:
Figs. 7 and 8 are end and side views, respectively, of the segment.

As one practical embodiment of this invention, Figs. 1 to 4 inclusive, show an improved shock absorber 10 which will now be described in greater detail. The shock absorber shown in this instance is a friction shock absorber of the direct acting tubular type comprising, in general, an elongated tubular housing or cylinder 11 and a friction unit 12 reciprocably operable in such housing. The shock absorber 10 also includes an actuating rod 13 which extends axially of the housing and has its inner end connected to the friction unit 12, as explained in greater detail hereinafter.

The housing 11 may comprise a cylinder barrel 15 which is closed at its lower end by a suitable cap 16 and at its upper end by a cover 17 through which the actuating rod 13 extends and which will be further described hereinafter. The lower end of the housing of the shock absorber is adapted for connection with one of a pair of relatively movable members, such as a vehicle axle, as by means of a ring or eye 18 which is welded or otherwise connected to the cap 16. The upper end of the shock absorber is adapted for connection with the other of the pair of relatively movable members, such as the body of a vehicle, as by means of a ring or eye 19 suitably attached to the outer end of the actuating rod 13. As shown in the drawings, the cap 16 can be a sheet metal stamping of dished form having its rim connected to the lower end of the cylinder barrel 15 by the welding 20.

The friction unit 12 comprises an expansible friction sleeve 22 and a pair of axially spaced longitudinally tapered expanders 23 and 24 cooperating with opposite ends of the friction sleeve for expanding the same into frictional engagement with the wall of the housing 11. The friction unit 12 also includes a stud 25 extending through the expanders 23 and 24 and connected with the inner end of the actuating rod 13 for mounting the friction unit thereon as will be further explained hereinafter.

The friction sleeve 22 comprises an annular series of transversely curved segments, in this instance three such segments, 22a, 22b and 22c. Each of these segments is provided adjacent its upper end and on the inside thereof with a transversely curved longitudinally tapered arcuate recess 26 and with a similar recess 27 adjacent its lower end. The tapered arcuate recesses 26 and 27 of the segments provide the upper and lower ends of the opening of the friction sleeve 22 with circumferentially spaced portions of a lobular shape in which corresponding portions of the tapered expanders 23 and 24 engage.

The upper and lower expanders 23 and 24 have transversely curved longitudinally tapered lobular portions 28 and 29 thereon which engage in the above-mentioned lobular recesses 26 and 27 of the segments and conform to the shape thereof. The expanders 23 and 24 can be of any suitable construction, for example, they can be cup-shaped sheet metal stampings having the lobular portions formed by bulges in the side walls thereof. As is understood by those skilled in this art, the cooperating tapered lobular recesses and bulges provided on the segments of the friction sleeve 22 and on the expanders 23 and 24 afford a surface contact between the expanders and segments which will always be of extensive area as distinguished from a line contact which occurs in most friction shock absorbing devices having a friction unit embodying tapered expanders.

The expanders 23 and 24 are provided with transverse end walls 30 and 31 at their small ends which have central openings through which the stud 25 extends. The expanders 23 and 24 are disposed with their small ends extending toward each other and into the friction sleeve 22 with their end walls 30 and 31 in spaced-apart relation. From the construction of the friction unit as thus far described, it will be seen that upon movement of the unit downwardly in the housing 11, such as upon the occurrence of a sudden shock, the upper expander 23 will be pushed downwardly into the friction sleeve 22 and will expand the same into frictional engagement with the housing wall. Similarly, upon upward movement of the friction unit 12 in the housing 11, as upon the occurrence of a rebound action, the lower expander 24 will be pulled upwardly into the lower end of the friction sleeve 22 and will expand the sleeve into frictional engagement with the housing wall.

The stud 25 of the friction unit 12 is provided at its lower end with a head 32 which solidly engages the end wall 31 of the lower expander 24. At its upper end the stud 25 is provided with a threaded portion 33 which engages in a threaded opening 34 of the inner end of the actuating rod 13. An adjusting nut 35 is mounted on the threaded portion 33 of the stud 25 and cooperates with the end wall 30 of the expander 23 in forming a pair of spring seats for a compression spring 36. The spring 36 is disposed around the stem of the stud 25 and acts on the expander 23 to provide a predetermined expansion of the friction sleeve 22 corresponding with a desired initial frictional engagement with the wall of the housing 11. A sleeve 37 disposed around the spring 36 provides a stop for the nut 35 for limiting the initial compression of this spring to an amount which will produce the above-mentioned desired initial frictional engagement. As shown in the drawings, the spring 36 and the sleeve 37 can be located in the recess of the upper expander 23.

The segments of the friction sleeve 22 are preferably provided at an intermediate point thereof with an external annular groove 39 in which a resilient retaining ring 40 is mounted. This retaining ring holds the segments in connected relation in sleeve form around the expanders 23 and 24 and also serves to contract the sleeve to relieve the frictional engagement with the wall of the housing 11 upon the occurrence of a relative separating movement between the expanders 23 and 24. When used, the spring ring 40 also facilitates the assembly and handling of the friction unit 12 because it holds the segments of the friction sleeve 22 together but, if desired, this spring ring can be omitted because assembly of the friction unit can be satisfactorily carried out by placing the segments in a suitable holder.

To relieve the frictional engagement between the unit 12 and the wall of the housing 11, this invention also provides a releasing spring 41 which is located between and seats against the end walls 30 and 31 of the expanders. The spring 41 is thus disposed inside the friction unit 12 in surrounding relation to the stud 25 and normally urges the segments apart for relieving the frictional engagement whenever the axial thrust of the actuating rod 13 on the friction unit 12 is removed or discontinued.

With the construction above described for the friction unit 12, this unit can be assembled and accurately adjusted prior to the final assembly of the shock absorber 10. This can be accomplished by assembling the friction sleeve 22, the expanders 23 and 24 and the springs 36 and 41 on the stud 25. The threaded portion 33 of the stud is then screwed through the nut 35 until the nut solidly engages the stop sleeve 37 or, in other words for a distance to cause the spring 36 to be compressed for the amount permitted by the stop sleeve. When the spring 36 has been compressed to this extent the stud 25 is backed out of the nut or unscrewed for approximately one turn as the final setting at which time the friction sleeve 22 will be expanded an amount corresponding with the desired initial frictional engagement with the wall of the housing 11. During the adjusting of the stud 25 relative to the nut 35, the stud can be rotated by means of the screw driver slot 38 provided in its upper end.

By adjusting the friction units 12 of a number of shock absorbers having the same capacity rating in this manner prior to final assembly of the friction units in the devices, it will be seen that the same initial frictional resistance value can be obtained for all of the shock absorbers. After the friction unit 12 has been thus assembled and adjusted, it is mounted on the inner end of the actuating rod 13 by screwing the threaded portion 33 of the stud 25 into the threaded opening 34 of the rod and causing the nut 35 to be jammed tightly against the inner end of the rod.

Another feature of the present invention consists in constructing the friction sleeve or lining 22 of a material which will enable the friction unit to operate smoothly and without abrasion in the housing 11, and which will result in a shock absorbing action which is affected to only a minimum amount by temperature changes or other variations in operating conditions and which permits the attainment of a shock absorbing action which is superior to the shock absorbing action obtained in prior devices of this kind. In accordance with this feature the segments 22a, 22b and 22c of the friction sleeve 22 are made of powdered metal, preferably a copper-base powdered metal or metal alloy, for example, powdered brass or bronze. The powdered metal is molded by a suitable molding method and apparatus to form the segments to the size and shape desired and, in this connection, it is pointed out that the segments can be molded with such accuracy that substantially no machining or finishing operation is required thereon. When the segments are made of powdered metal they do not have the tendency to pick up slivers of metal from the cylinder wall as is the case with segments molded from a non-metallic plastic material and which slivers then render the plastic segments abrasive in character.

Figure 4:
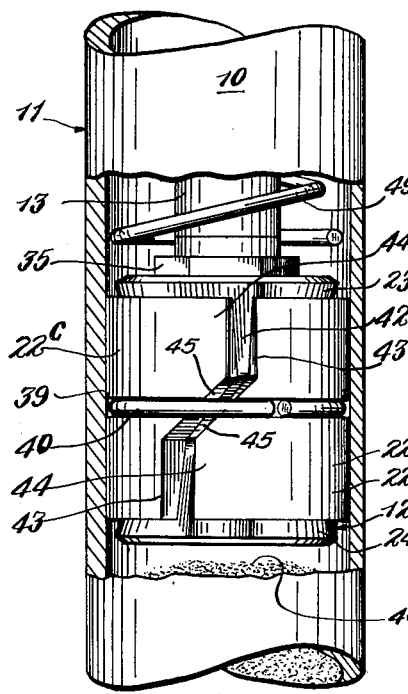
Fig. 4 is another partial longitudinal section corresponding with Fig. 2, but showing the friction unit in outside elevation.
Figure 8:
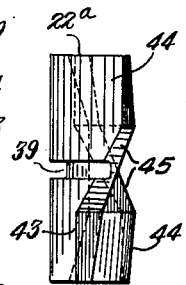
Figure 6:
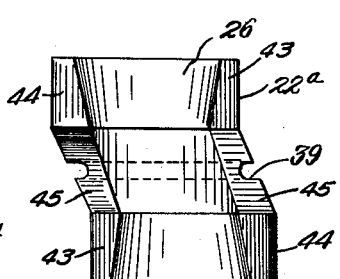
Fig. 6 is a detail view showing one of the segments of the friction unit in elevation.
Figure 5:
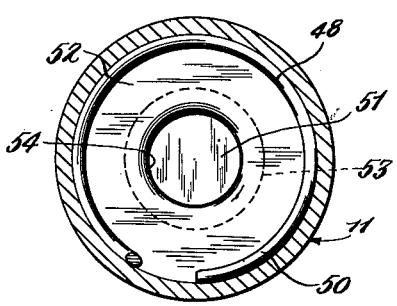
Fig. 5 is another transverse section taken through the shock absorber of Fig. 1, as indicated by section line 5—5 and further illustrating the magnet means.

Another novel feature embodied in the construction of the friction unit 12 is that the segments are of a shape such that grooving of the wall of the housing 11 will be prevented during operation of the friction unit therein. To prevent such grooving of the wall of the housing 11, the segments are constructed so that the joint 42 formed between each pair of adjacent segments is a staggered joint, as shown in Fig. 4 of the drawings. In obtaining the staggered joint 42, each of the segments is constructed so as to have a recessed or inset edge portion 43 at one end thereof extending for a portion of the axial length of the segment and an arcuately extending edge projection 44 at the other end having substantially the same axial length as the inset edge portion 43. The edge portion of each segment, which is located between and connecting the inset portion 43 and the edge projection 44, is an inclined edge portion 45 which, as shown in the drawings, may be inclined at approximately 45° to the longitudinal axis of the friction unit 12. When the segments are assembled to form the friction sleeve 22, the arcuate projection 44 of one segment has a substantially interfitting engagement with the recess 43 of the adjacent segment as shown in Fig. 4, thereby providing the above-mentioned staggered joint 42.

In the improved shock absorber 10 a quantity of a loose dry lubricating powder 46 is confined in the housing 11 for cooperation with the friction unit 12. A lubricating powder has been used heretofore in shock absorbing devices of this kind, but so far as I am aware all of the lubricating powders heretofore used have been subject to the disadvantage that changes occur in the characteristics thereof in response to changes in the operating temperature of the shock absorber. For example, when calcium stearate is used as the lubricating powder in a friction shock absorber it tends to become sticky or gummy when the shock absorber is required to operate at increased temperatures. I have discovered that this disadvantage can be overcome by using lithium stearate as the lubricating powder 46.

During the operation of the shock absorber 10 the lubricating powder 46 is agitated and a portion of this powder is displaced from one side of the friction unit 12 to the other during reciprocation of this unit in the housing 11. The flow or transfer of the powder from one side of the friction unit to the other takes place through the joints 42 of the friction sleeve. The powder 46 is distributed to all portions of the interior of the shock absorber and forms a lubricating surface or coating on the moving parts which results in a smooth shock absorbing action of uniform characteristics. The lithium stearate used as the lubricating powder 46 is affected to only a minimum extent by temperature changes and its lubricating characteristic remains substantially constant throughout a long period of service for the shock absorber.

Although the circumferentially offset relation of the paired axial edge portions 43 and 44 and the inclined relation of the intermediate connecting edge portions 45 result in the passages of the staggered joints 42 being of a zig-zag shape, these passages still permit the lubricating powder 46 to flow readily from one side of the friction unit 12 to the other. This flow of the powder through the joints 42 is facilitated by the inclined relation of the intermediate edge portions 45, such that caking or packing of the powder in these joints is not likely to occur.

In accordance with another feature of the present invention, the shock absorber 10 is provided with a compression spring 48 of a substantially hourglass shape in the lower end of the housing 11, and preferably, with another such hourglass spring 49 in the upper end of the housing. The springs 48 and 49 are of a length such that when the friction unit 12 operates in the central portion of the housing 11 it will be spaced from the adjacent ends of both of these springs. Such operation of the friction unit 12 in the central portion of the housing corresponds with boulevard travel, that is to say, corresponds with conditions when the vehicle is traveling on a smooth pavement.

During such boulevard travel neither of the springs 48 and 49 will be engaged by the friction unit 12 and the springs will then have no effect on the operating characteristics of the shock absorber. Upon the occurrence of a sudden shock, however, the friction unit 12 may move downwardly far enough for the end of the expander 24 to engage the spring 48 or may travel upwardly far enough for the end of the expander 23 to engage the end of the spring 49. Upon the occurrence of either of these events the spring thus engaged causes the corresponding expander to further expand the friction sleeve 22 and augment the frictional resistance developed between the friction unit and the wall of the housing 11.

In addition to their function of increasing the expansion of the friction unit 12, as just explained above, the springs 48 and 49 also effectively produce an agitation of the powder 46 and prevent packing or caking of the powder in the ends of the housing 11.

The springs 48 and 49 can be retained in the ends of the housing 11 by constructing the outer end convolutions 50 thereof of a size such that when the springs are assembled into the housing these end convolutions will frictionally engage the wall of the housing. When the lower spring 48 is assembled in the lower end of the housing 11 the convolution 50 also seats against the cap 16 and the end convolution 50 of the upper spring 49 also seats against the cover means 17.

In shock absorbing devices of the kind having a fluid material confined in the housing thereof, such as the loose dry lubricating powder 46 which is confined in the housing 11, it is sometimes found that particles of metal or other magnetic material are present in the confined fluid material and interfere with a proper functioning of the shock absorber. For example, it has been found that the reciprocation of a friction unit in a shock absorber housing may cause fine particles of metal to be abraded from the wall of the housing and to become mixed in the fluid material, such as in the confined lubricating powder 46. Provision is made for separating such magnetic material from the confined fluid material and this separating means will be described next.

As shown in the drawings, the separating means for separating magnetic particles from the lubricating powder 46 comprises magnet means, preferably in the form of a permanent magnet 51 located in the lower end of the housing 11. The permanent magnet 51 is here shown in the form of a disk which is separated or isolated from magnetic contact with the metal wall of the housing 11 by means of a body of non-magnetic material, such as the body 52 which may be molded from rubber or plastic.

The insulating body 52 has an undercut groove or recess 53 therein in which the rim of the magnet disk 51 engages for retaining the latter in place. The body 52 also has a central opening 54 through which the powder 46 can come into contact with the magnet. The body 52 is preferably of a size and shape to seat in the lower end of the housing 11 and can be held in seating engagement with such lower end by the end convolution 50 of the spring 48. During the agitation of the powder 46 in the housing 11 the magnetic particles will be attracted by the permanent magnet 51 and will be held by the latter at or adjacent the lower end of the housing in which position they can have no harmful effect on the moving parts of the device.

Figure 9:
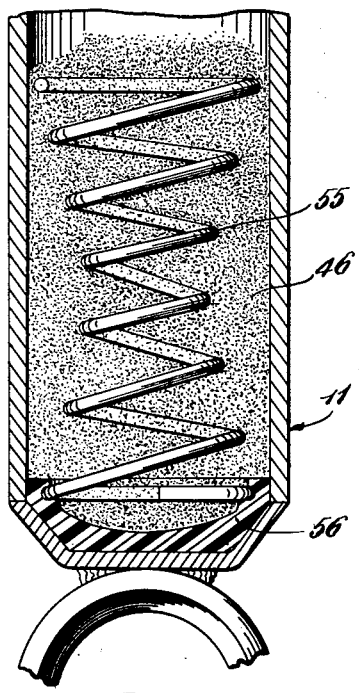
Fig. 9 is a partial longitudinal section taken through a modified form of the improved shock absorber.

Instead of providing a permanent magnet in the housing 11 in the form of a separate member, such as the above described magnet disk 51, a permanent magnet can be provided in the lower end of the housing by using therein a magnetized spring, as illustrated in Fig. 9, and which is here shown as being of a substantially hourglass shape and serves the same purpose of the above described hourglass spring 48. When the magnetized spring 55 is used, its lower end is maintained out of magnetic contact with the wall of the housing 11 as by means of an insulating body 56 of molded rubber or plastic. The magnetic spring 55 attracts and holds the magnetic particles and thus separates them from the lubricating powder 46 and, in accomplishing this function, the magnetized spring produces a magnetic circuit through portions of the wall of the housing 11 which will result in an effective separation of the magnetic particles from the powder.

It will be understood, of course, that the insulating body 56, as well as the insulating body 52 for the magnet disk 51, could be made from a non-magnetic metal such as copper instead of being made of rubber or plastic.

Reverting now to the cover means 17 for the upper end of the housing 11, it is pointed out that this cover means may comprise a cap member 58 and a bushing 59 located in such cap member. The cap member 58 can be in the form of a cup-shaped sheet metal stamping having an outturned flange 60 at its lower end which engages in an internal groove 61 of the housing 11. A metal disk 62 lying against the flange 60 forms the inner end wall for the cap member 58. The flange 60 and the disk 62 can be locked in the annular groove 61 as by being welded therein, or preferably by the end of the housing 11 being spun into a retaining flange or bead as indicated at 63.

The bushing 59 is made of powdered metal, preferably a copper-base powdered metal such as brass or bronze. This bushing is molded to the desired size and shape from such powdered metal and requires substantially no machining or finishing operations thereon. When the bushing 59 is of this construction it provides a very efficient and durable bearing for the actuating rod 13.

It should be explained in connection with the use of powdered metal in forming the bushing 59 and the segments 22a, 22b and 22c of the friction unit 12, that the powdered metal is preferably used in its dry or natural state, that is, without having any lubricant contained therein, or in a dry state with only a sufficient amount of a suitable binder added as may be needed to adhere the metal particles together. Although the metal powder is preferably one which does not contain any lubricant, it should be understood, however, that in some cases it may be desirable to use a metal powder which contains an appropriate amount of a suitable lubricant such as graphite.

The closure means 17 preferably also embodies a seal for preventing the escape of the powder 46 from the housing 11 around the actuating rod 13. In this instance this seal is provided by a packing element 64 in the form of an O-ring made of molded resilient rubber or other suitable material and disposed around the actuating rod. The sealing ring 64 can be located in an annular recess 65 provided in the outer end of the bushing 59 and can be confined in such recess by the inturned annular flange 66 of the cap member 58.

The shock absorber 10 preferably also includes an outer housing member or guard 67 which is carried by the actuating rod 13 and disposed in telescoping relation around the housing 11. In this instance, the guard 67 comprises a cup-shaped member 68 mounted on the actuating rod 13 at a point adjacent the eye 19 and a sleeve 69 which is connected with the member 68 so as to form a tubular extension thereof.

From the foregoing description and the accompanying drawings it will now be readily understood that this invention provides an improved shock absorber embodying the above described novel features and which is very rugged and durable and which will produce a superior shock absorbing function during a prolonged period of service and with minimum attention being needed.

Although the improved shock absorber of the present invention has been illustrated and described herein to a detailed extent, it should be understood however that the invention is not to be regarded as being limited correspondingly in scope but includes all changes and modifications coming within the terms of the claim hereof.

Having thus described my invention, I claim:

A shock absorber comprising, a housing having a cylinder therein, a plunger slidably operable in said cylinder and having friction means adapted to be expanded into frictional engagement with the wall of said cylinder; and a loose dry lubricating powder confined in said housing, said lubricating powder comprising lithium stearate.

JACOB RUSH SNYDER.

(References on following page)

REFERENCES CITED

The following references are of record in the file of this patent:

UNITED STATES PATENTS

| Number | Name | Date |
|---|---|---|
| 274,715 | Buckley | Mar. 27, 1883 |
| 736,071 | Christianson | Aug. 11, 1903 |
| 1,927,627 | Calkins et al. | Sept. 19, 1935 |
| 2,178,527 | Wellman | Oct. 31, 1939 |
| 2,237,318 | Snyder | Apr. 8, 1941 |
| 2,237,319 | Snyder | Apr. 8, 1941 |
| 2,373,508 | Snyder | Apr. 10, 1945 |
| 2,389,061 | Kuzmick | Nov. 13, 1945 |
| 2,404,666 | Snyder | July 23, 1946 |
| 2,426,261 | Dath | Aug. 26, 1947 |
| 2,562,595 | Blue | July 31, 1951 |

FOREIGN PATENTS

| Number | Country | Date |
|---|---|---|
| 3,571 | France | 1848 |

OTHER REFERENCES

Publication on "The Role of Lithium Stearate in Greases and Waxes" by H. C. Meyers, Jr., Foote Prints, vol. 16, November 1, 1944.